Patented June 18, 1929.

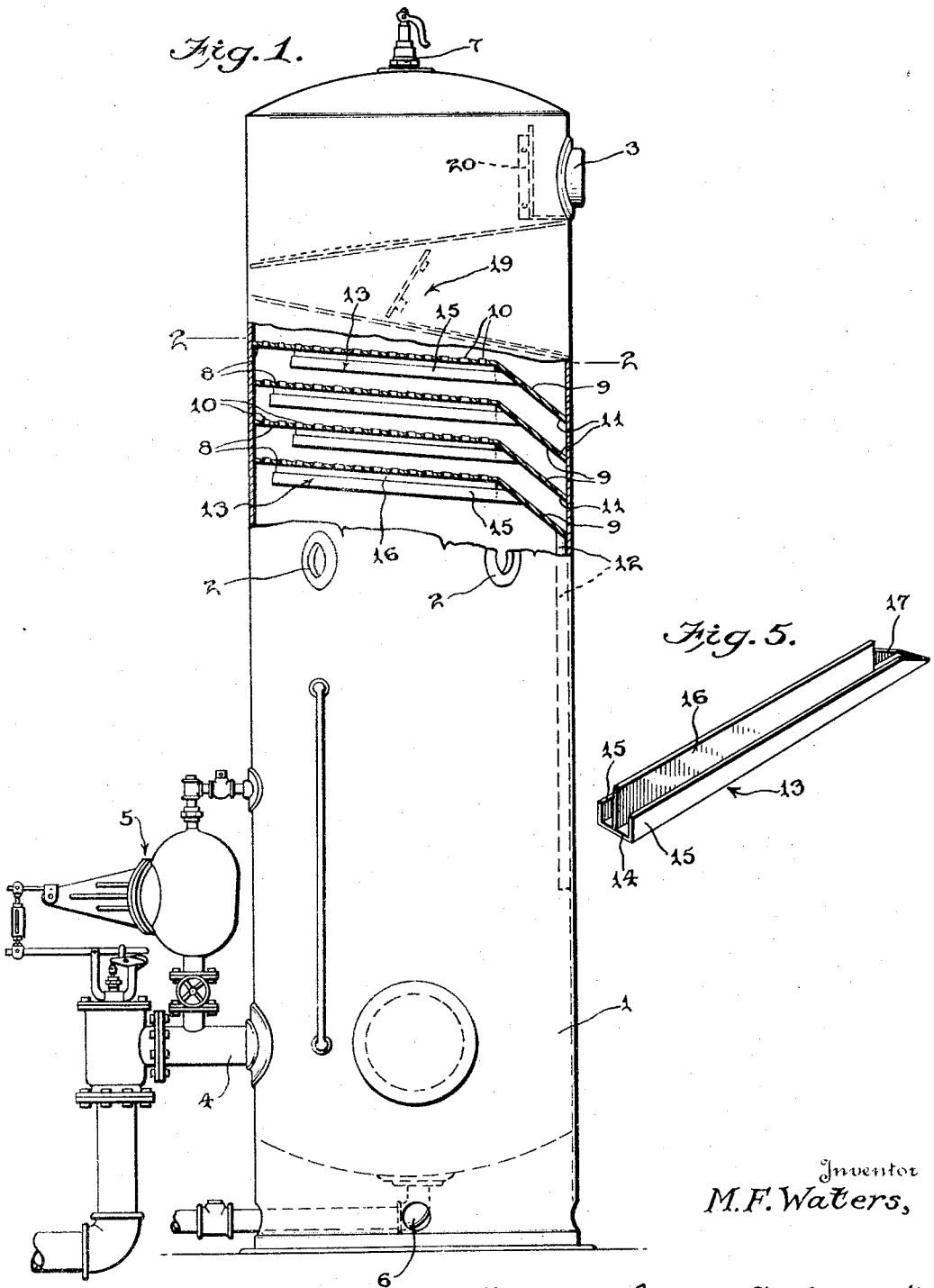

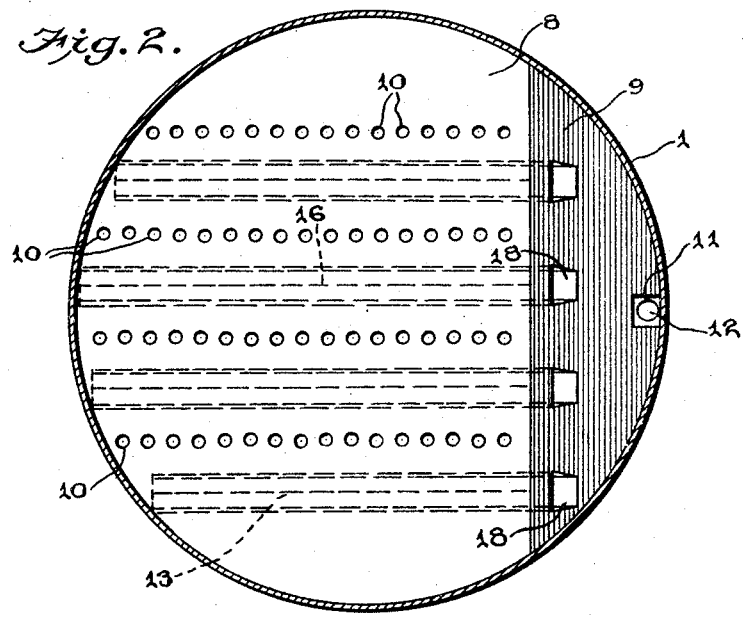
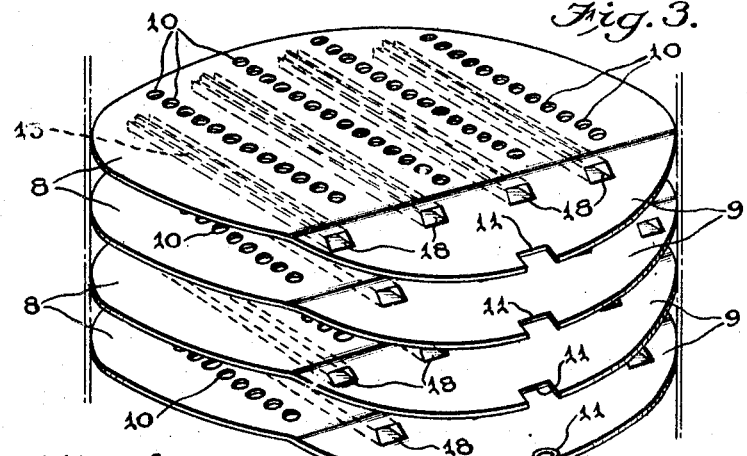
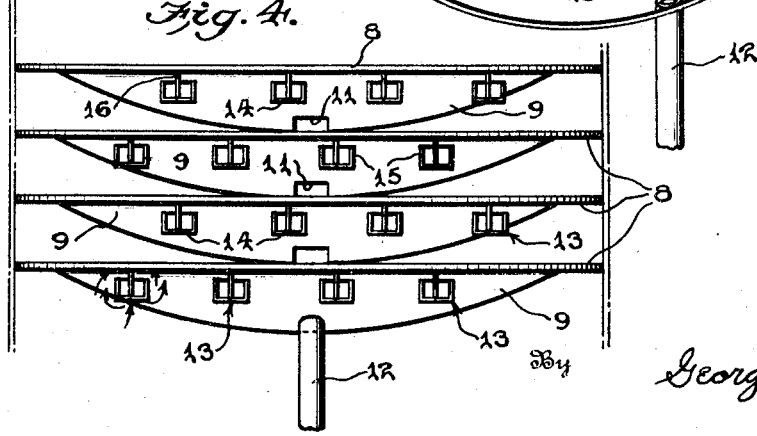

1,718,013

UNITED STATES PATENT OFFICE.

MILLARD F. WATERS, OF TULSA, OKLAHOMA, ASSIGNOR TO SMITH SEPARATOR COMPANY, OF TULSA, OKLAHOMA.

BAFFLE FOR OIL AND GAS SEPARATORS.

Application filed July 2, 1928. Serial No. 289,824.

My invention consists in new and useful improvements in baffles for oil and gas separators, and has for its object to provide an arrangement of baffles, whereby the gas and entrained liquids are distributed and broken up into as many fine streams as possible, permitting the gas to expand and through a series of surface contacts, free itself from the liquid carried thereby, and pass out of the separator a dry gas.

Another object of my invention is to provide a novel means for carrying the separated liquid to the bottom of the tank, without hindering the upward passage of the gas through the series of baffles.

A still further object of my invention is to arrange the baffles at such an angle with respect to the tank, that the gas, during its upward passage, will be caused to travel along the under sides of said baffles, for a predetermined distance, thereby undergoing a scrubbing operation.

With the above and other objects in view which will appear as the description proceeds, my invention consists in the novel features herein set forth, illustrated in the accompanying drawings, and more particularly pointed out in the appended claims.

Referring to the drawings, in which numerals of like character designate similar parts throughout the several views, Fig. 1 is a view in side elevation, partly broken away showing my improved baffle arrangement applied to an oil and gas separator tank.

Fig. 2 is a view in horizontal section, taken on line 2—2 of Fig. 1.

Fig. 3 is a perspective view of a nest of baffles arranged in accordance with my invention.

Fig. 4 is a side view from the opposite direction, and

Fig. 5 is an enlarged perspective view of one of the liquid conveying troughs secured to the under side of said baffles.

In the drawings, 1 represents a conventional oil and gas separator tank having the usual oil and gas inlets 2, the gas outlet 3 at the upper extremity, the oil outlet 4 at the lower extremity, controlled by the float operated valve mechanism 5, the sand drain 6 at the bottom of the tank, and the safety valve 7 at the upper end thereof.

My improved baffle arrangement is located in the upper portion of the tank 1, immediately above the oil and gas inlets 2, and consists of a series of superposed baffle plates 8 which are substantially circular in shape, and bent downwardly at one end to form angularly disposed flanges 9. The plates 8 are secured snugly against the inner walls of the shell of the tank 1, at their peripheries, by any suitable means, and are retained in the relative positions shown in the drawings, being slightly inclined toward the flanged ends 9. These plates are provided with a series of rows of perforations 10, provided with raised lips on their upper sides, and arranged in staggered relation, whereby the gas passing upwardly therethrough, is caused to travel a tortuous path.

Each of the flanges 9 extends downwardly to a point below the perforated surface of the baffle beneath, and is cut out as at 11, at its lowermost point, to allow oil to drain therethrough, as will be hereinafter described. This point on the lowermost baffle 9, is connected into a vertically extending oil drain pipe 12, located directly in line with the cut out portions 11 of the baffles above, whereby the oil knocked out of the gas by said baffles, is conveyed to the bottom of the tank 1.

Between the rows of perforations 10, on each of the plates 8, and also in staggered relation, I provide a series of troughs 13, each of which, as clearly shown in Fig. 5, consists of a bottom 14, side walls 15, and a vertically extending fin 16, secured centrally of the bottom 14, and projecting a predetermined distance above the side walls 15, whereby said troughs are secured to the under sides of the baffle plates 8, as shown in Figs. 1 and 4 of the drawings. The side walls at one end of each of the troughs 13, are inclined, as at 17, and extend through openings 18 in the flanges 9, whereby any liquid contained in the troughs 13, will be conveyed out upon the upper surface of said flanges 9, as hereinafter set forth.

19 and 20 represent additional baffles of the type shown and described in my copending application Serial No. 213,118, filed Aug. 15, 1927, which are used in connection with the present nest of baffles, but form no part of this invention.

Having thus described the details of construction, and the arrangement of the different elements of my improved oil and gas separator baffle, its operation is as follows.

The mixture of oil and gas enters the separator tank through inlets 2, which are usually provided with means for deflecting the liquid downwardly, and allowing the gases to rise. At this point, of course, the rising gas has entrained therewith, a quantity of the liquid hydrocarbons, and it is to remove these from the gas that my improved nest of baffles is provided.

Upon entering the tank, as before stated, the gas immediately rises, and comes in contact with the under side of the lowermost baffle and troughs 13. It first encounters the bottom side of troughs 13, where it is spread out and broken up, the heavier liquids being knocked back to the bottom of the tank, those lighter liquids which are carried on therewith, being conveyed around the outer surfaces of the side walls of the trough, and coming in contact with the fins 16, where more of said liquid is removed from the gas and deposited in the troughs 13, from whence it is conveyed to the upper inclined surfaces of the flanges 9, and seeking its way by gravity to the lowest point thereon, drains through the aperture 11 into the drain pipe 12, and back to the bottom of the tank.

It is obvious that when the gas and entrained liquid encounters the under side of the baffle, the liquid naturally adheres to the baffle, part of said liquid passing on through the apertures 10, and the balance being forced back toward the suspended fin 16 of the trough, which part of said trough, due to its location, forms what we might call a quiet sector, on the under side of the baffle, being protected from the disturbance of the upward flowing gas. When the liquid reaches this quiet sector, it will then drop into the trough and out of the path of the gas, the latter passing on upward through the apertures 10 in the remainder of the series of baffles, until it is completely relieved of all liquid content.

The liquids which are knocked back directly onto the upper surfaces of the baffle plates 8, flows by gravity to the angular flanges 9, and drains into pipe 12, as does the liquid from the troughs 13, due to the inclination of said baffle plates. Said liquid is prevented from dropping through the perforations 10, by the lips before mentioned.

The dry gas is then carried off through the outlet 3 in the upper portion of the tank, while the liquid or oil is discharged through the outlet 4 in the lower portion thereof.

It will be seen by this operation, that the gas is repeatedly cut through many fine streams by the series of perforations, each of said perforations being immediately under the bottom side of one of the troughs 13, and as the gas comes through the perforations, it naturally comes in contact with said troughs, where it is further broken up.

From the foregoing, it is believed that my invention may be clearly understood by those skilled in the art, without further description, it being borne in mind that numerous changes may be made in the details of construction, without departing from the spirit of the invention as set forth in the following claims.

What I claim and desire to secure by Letters Patent is:—

1. In an oil and gas separator, a series of perforated baffles arranged in superposed relation, each of said baffles having an angularly disposed flange depending from one end thereof, troughs mounted on the under side of said baffles and opening onto the upper faces of the respective flanges and means for conveying liquids from the flanges to a point remote therefrom.

2. Apparatus as claimed in claim 1 wherein each of said flanges extends downwardly to a point below the main portion of the baffle beneath.

3. Apparatus as claimed in claim 1 wherein each of said flanges extends downwardly to a point below the main portion of the baffle beneath, the means for conveying liquids from the flanges including oil drain openings arranged at the lowest points of said flanges.

4. In an oil and gas separator, a series of perforated baffles arranged in superposed relation, each of said baffles having an angularly disposed flange depending from one end thereof, openings in said flanges, troughs suspended from the under sides of said baffles and extending through said openings in said flanges, drain apertures in said flanges and a drain pipe connected to the aperture in the lowermost flange, whereby liquid gathered in said troughs is discharged onto the upper surfaces of said flanges and conveyed to a point remote therefrom.

5. Apparatus as claimed in claim 4, wherein the perforations in said baffles are arranged in rows in staggered relation.

6. Apparatus as claimed in claim 4 wherein the perforations in said baffles are arranged in rows in staggered relation and said troughs are mounted intermediate the rows of perforations also in staggered relation.

In testimony whereof I affix my signature.

MILLARD F. WATERS